(12) United States Patent
Gladwin et al.

(10) Patent No.: US 8,171,102 B2
(45) Date of Patent: **\*May 1, 2012**

(54) SMART ACCESS TO A DISPERSED DATA STORAGE NETWORK

(75) Inventors: S. Christopher Gladwin, Chicago, IL (US); Greg Dhuse, Chicago, IL (US); Vance T. Thornton, Chicago, IL (US); Ilya Volvovski, Chicago, IL (US); Jamie Bellanca, Chicago, IL (US)

(73) Assignee: Cleversafe, Inc., Chicago, IL (US)

( \* ) Notice: Subject to any disclaimer, the term of this patent is extended or adjusted under 35 U.S.C. 154(b) by 21 days.

This patent is subject to a terminal disclaimer.

(21) Appl. No.: 12/684,085

(22) Filed: Jan. 7, 2010

(65) Prior Publication Data
US 2010/0115063 A1    May 6, 2010

Related U.S. Application Data

(63) Continuation of application No. 11/973,622, filed on Oct. 9, 2007.

(51) Int. Cl.
*G06F 15/167* (2006.01)

(52) U.S. Cl. ........ 709/216; 709/211; 709/213; 709/217; 711/137; 711/170; 370/352

(58) Field of Classification Search .......... 709/213–216; 711/137–170
See application file for complete search history.

(56) References Cited

U.S. PATENT DOCUMENTS

| | | | | |
|---|---|---|---|---|
| 7,228,339 B2 * | 6/2007 | Yamamoto et al. | ........... | 709/217 |
| 7,386,674 B1 * | 6/2008 | Lango | ........... | 711/137 |
| 7,840,723 B1 * | 11/2010 | Kemkar | ........... | 710/36 |
| 7,904,492 B2 * | 3/2011 | Sarma et al. | ........... | 707/812 |
| 2003/0093490 A1 * | 5/2003 | Yamamoto et al. | ........... | 709/213 |
| 2004/0213204 A1 * | 10/2004 | Yang | ........... | 370/352 |
| 2004/0221018 A1 * | 11/2004 | Ji | ........... | 709/217 |
| 2005/0240749 A1 * | 10/2005 | Clemo et al. | ........... | 711/170 |
| 2006/0179123 A1 * | 8/2006 | Smith | ........... | 709/218 |
| 2007/0239952 A1 * | 10/2007 | Hwang et al. | ........... | 711/162 |
| 2007/0271349 A1 * | 11/2007 | Clemo et al. | ........... | 709/211 |

\* cited by examiner

*Primary Examiner* — Quang N. Nguyen
*Assistant Examiner* — Razu Miah
(74) *Attorney, Agent, or Firm* — Garlick & Markison; Timothy W. Markison

(57) ABSTRACT

A method for reading data from a dispersed data storage network that includes a plurality of slice servers. The method begins by accessing a list of slice servers of the plurality of slice servers, wherein each slice server on the list stores at least one data slice associated with a data segment of the data. The method continues by transmitting read requests to at least some of the slice servers on the list. The method continues by receiving a data slice from a slice server on the list. The method continues by determining whether a threshold number of data slices has been received. The method continues, when the threshold number of data slices has been received, assembling the data segment from at least the threshold number of data slices.

22 Claims, 5 Drawing Sheets

Smart Access - Reading

| | Ping Time | Historical Response Time | Load % | Composite Score |
|---|---|---|---|---|
| Slice Server 1 | 61ms | 62ms | 0.36 | 33.24 |
| Slice Server 2 | 132ms | 137ms | 0.71 | 17.83 |
| Slice Server 3 | 174ms | 29ms | 0.99 | 43.03 |
| Slice Server 4 | 33ms | 74ms | 0.68 | 45.21 |
| Slice Server 5 | 27ms | 29ms | 0.21 | 73.90 |

Composite Score = $A/T_p + B/T_h + C/L$

Fig. 3

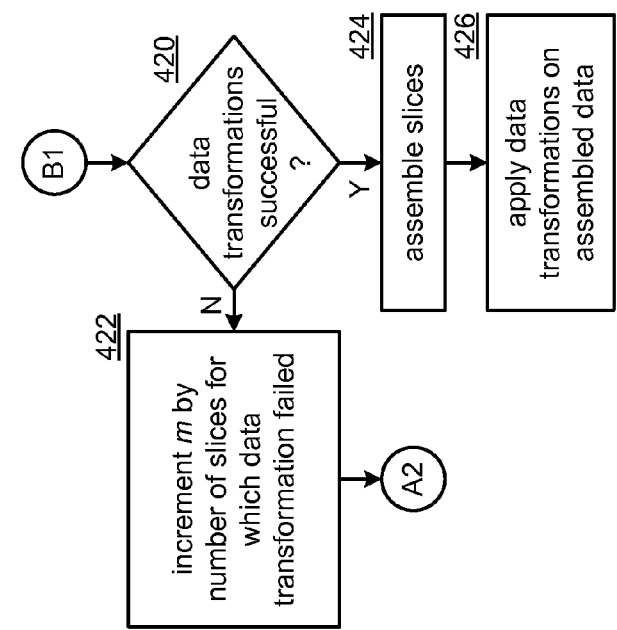
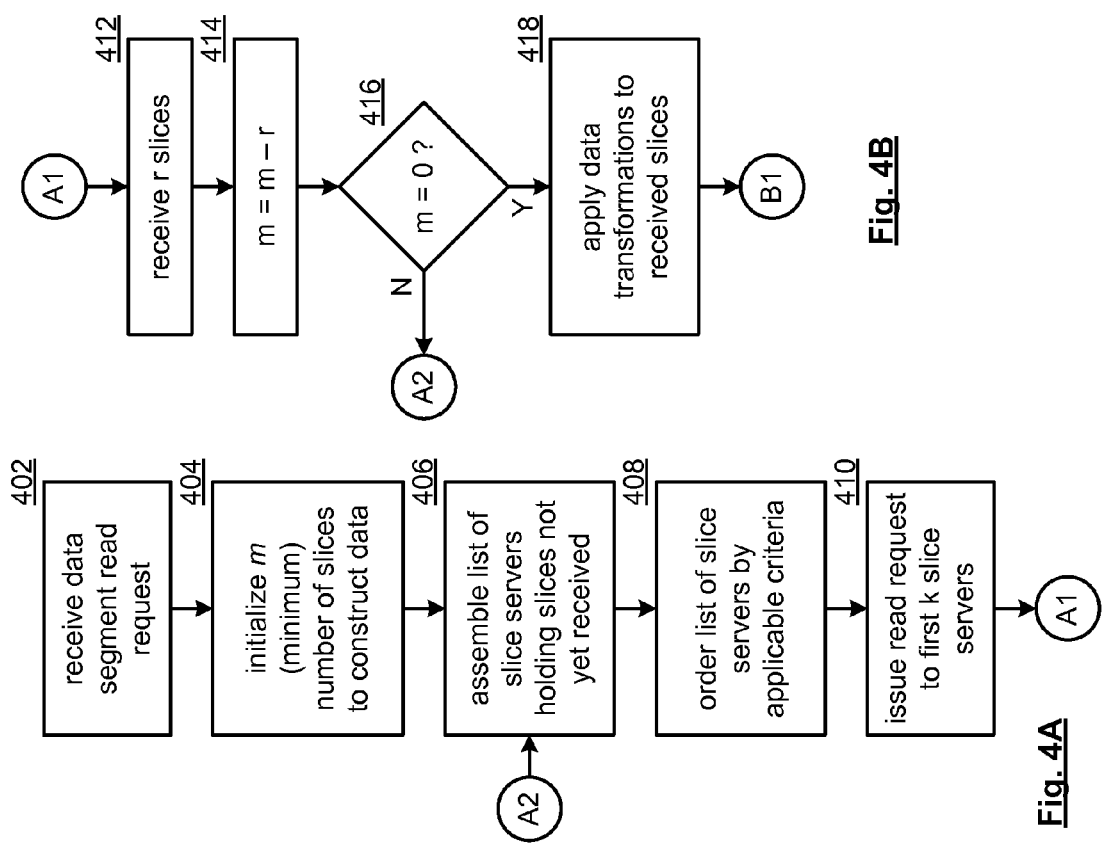
Fig. 4C
Fig. 4B
Fig. 4A

SMART ACCESS TO A DISPERSED DATA STORAGE NETWORK

This patent application is claiming priority under 35 USC §120 as a continuing patent application of co-pending patent application entitled SMART ACCESS TO A DISPERSED DATA STORAGE NETWORK, having a filing date of Oct. 9, 2007, and a Ser. No. 11/973,622.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for accessing a dispersed data storage network.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

In 1979, two researchers independently developed a method for splitting data among multiple recipients called "secret sharing." One of the characteristics of secret sharing is that a piece of data may be split among n recipients, but cannot be known unless at least t recipients share their data, where $n \geq t$. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSN"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Nonetheless, DDSN technology has not achieved widespread acceptance or use. One important problem involved in the implementation of DDSNs is how to effectively manage a network of dispersed storage servers, hereinafter referred to as slice servers. For example, when a block of data is read from a dispersed data storage network, 20 or more data slices may be required to reconstruct the data block. Each of the data slices must be read from separate slice servers, which have differing performance and load characteristics. Factors affecting slice server performance include, but are not limited to increased load, hardware and/or software failures on the slice servers, and damage to network infrastructure.

In many circumstances, a particular user of a dispersed data storage network may not want to use a slice server to store data even though, based on objective criteria, the slice server in question performs well. For example, a government entity may insist that all slice servers storing that entity's data are located within territory that the government is sovereign over.

BRIEF DESCRIPTION OF THE DRAWINGS

FIG. 3 is a table characterizing performance parameters of a number of slice servers;

FIGS. 4A-4C collectively illustrates a read operation from a dispersed data storage grid constructed in accordance with an embodiment of the disclosed invention;

DETAILED DESCRIPTION OF THE ILLUSTRATED EMBODIMENT

Figure 1:
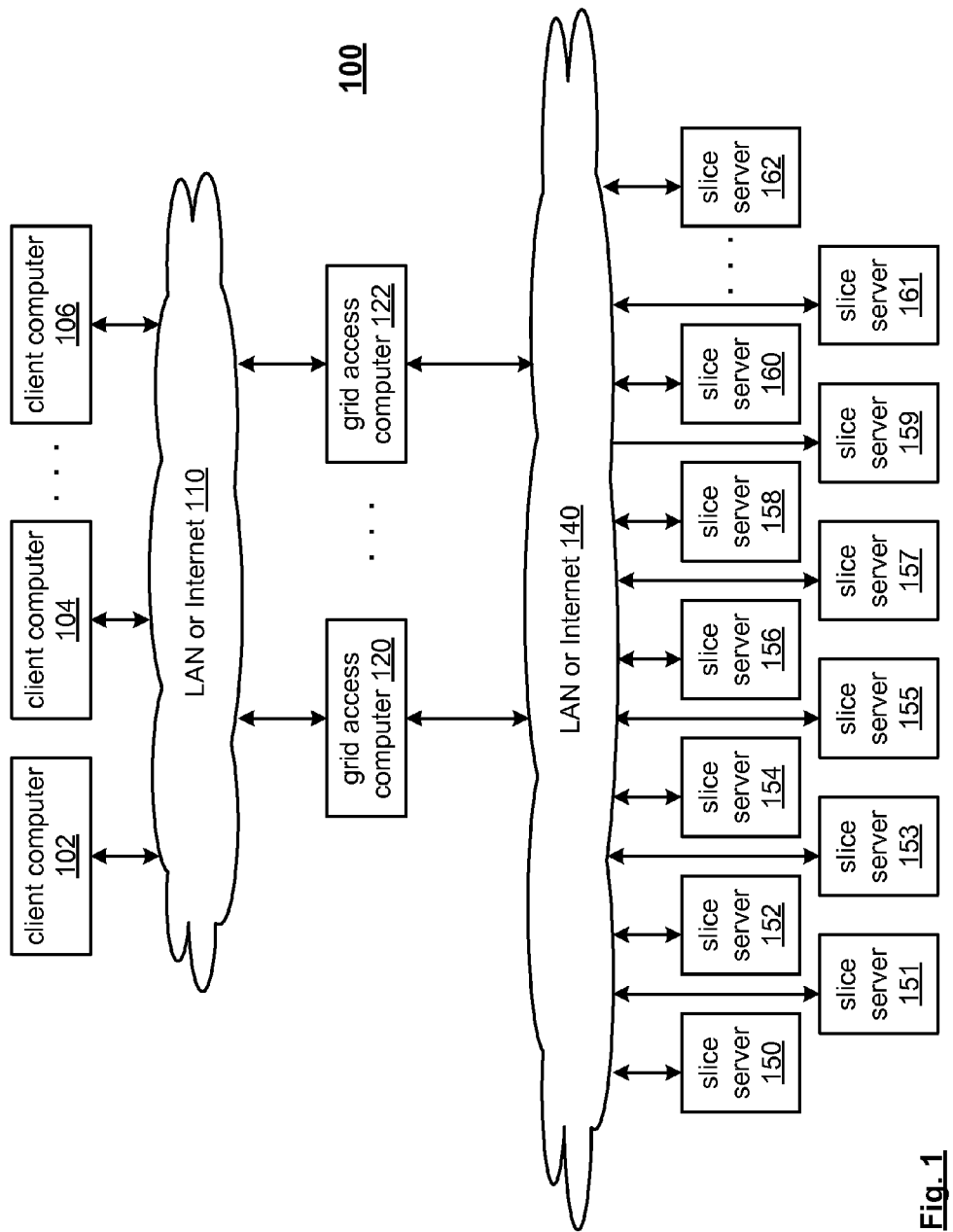
FIG. 1 is a network diagram of a dispersed data storage network constructed in accordance with an embodiment of the disclosed invention.

Turning to the Figures, and to FIG. 1 in particular, a distributed computer system implementing a dispersed data storage grid 100 is shown. An arbitrary number of slice servers 150-162 store data slices sent to them by networked client computers 102,104,106. As illustrated, some number of grid access computers 120,122 allow access to the slice servers 150-162 by the client computers 102,104,106.

As explained herein, the disclosed invention allows a dispersed data storage network 100 to be more effectively accessed by client computers 102,104,106. In accordance with the disclosed invention, access to a collection of slice servers 150-162 can be optimized through the use of objective criteria to obtain a preference rating for each slice server. Each slice server 150-162 will have individual performance related characteristics. For example, a particular slice server 150 may comprise a sophisticated multi-core state of the art CPU as well as a state of the art SAN with extremely fast and responsive drives, and a fast, reliable connection to the Internet. A second slice server 157 may comprise an older, slower CPU, outdated, slow and limited storage, and a modest and unreliable connection to the Internet. All else being equal, the performance of a dispersed data storage network 100 would be substantially improved if operations were fulfilled by slice server 150 as opposed to slice server 157. Alternatively, the poor performance of a server can be minimized by accessing more servers than are required. For example, if a particular block of data to be read requires that three slices be retrieved to assemble the block, slices could be read simultaneously from five servers and the first three slices retrieved could be used to assemble the desired data block.

In the illustrated dispersed data storage network 100, client computers 102,104,106 read data from and write data to slice servers 150-162 through grid access computers 120,122. When a read or write is initiated, grid access computers 120,122 select appropriate slice servers 150-162 to fulfill the read or write. For example, a DDSN where data is split into four separate slices could be implemented by any four of the illustrated servers. Assuming that the information dispersal algorithm employed by the DDSN requires that three slices are required to reconstruct stored data, a grid access computer 120 retrieving a data segment for a client computer could use a number of different techniques. The simplest technique would be to simultaneously issue read requests for the appropriate data slice to all four slice servers holding relevant data, and then use the first three slices retrieved to reconstruct the requested data block. Alternatively, the grid access computer could rank the four slice servers holding relevant data slices using a group of performance criteria, and issue simultaneous requests only to the three highest ranked slice servers.

Network outages are a common occurrence for any network based system, and the disclosed invention provides an improved method for dealing with a network outage affecting at least part of a dispersed data storage network. In particular, where one or more slice servers within the dispersed data storage network are unavailable, then a system implementing the disclosed invention will make a determination whether a particular read or write operation can be completed. If a particular operation cannot be implemented, the requesting computer will be notified with an appropriate error message. A DDSN is a distributed system with multiple layers. Generally, a client computer will make a request to a grid access computer, which will then direct appropriate commands to some number of slice servers. In such a situation, it is not always impossible to return an intelligent error code. However, in the situations where it is possible to return a correct error code, good practices demand that such an error code be returned. For example, if a read operation fails because too many data slices have become corrupted to reconstruct the requested data segment, the client computer should be informed so that appropriate action can be taken.

Figure 2:
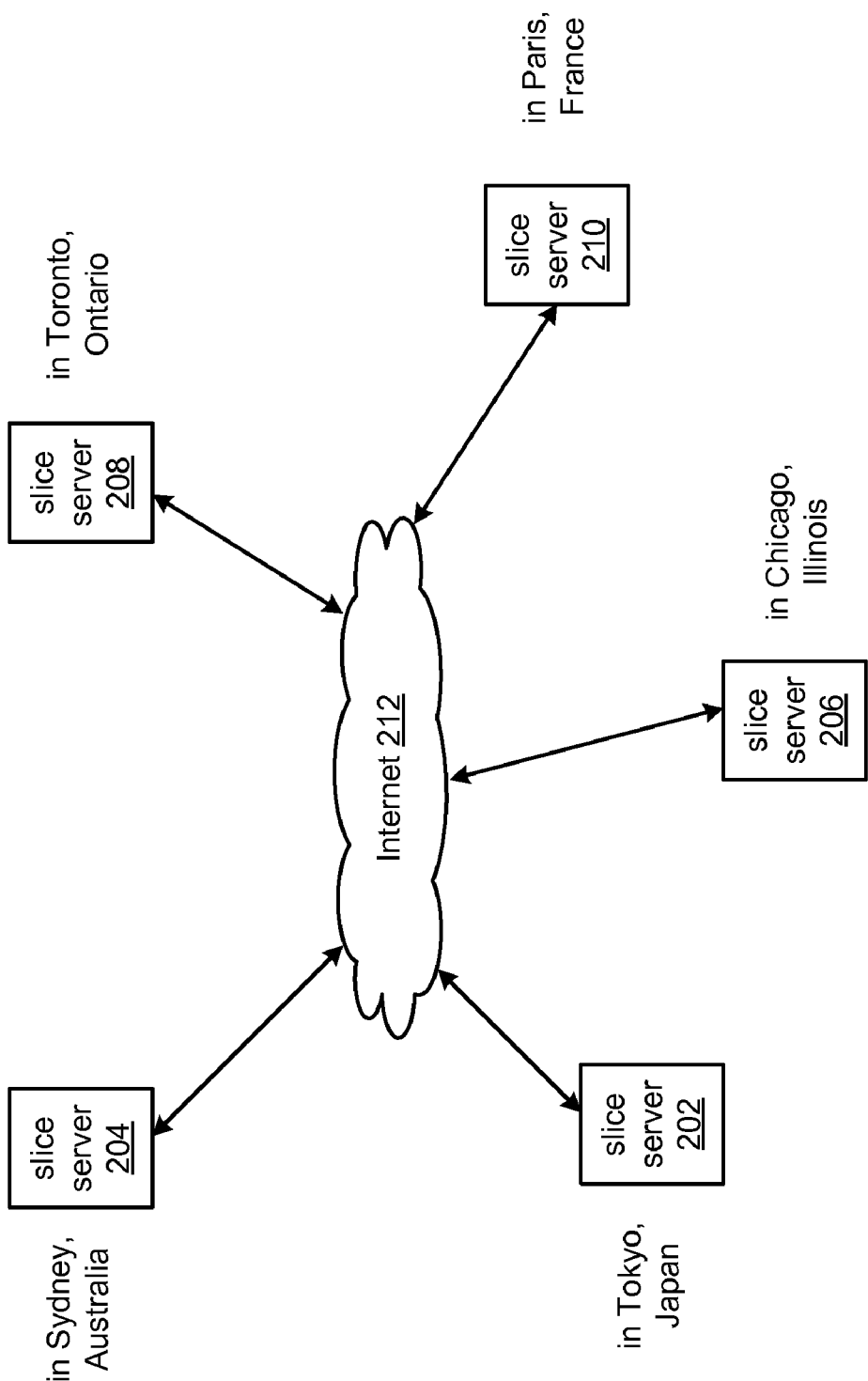
FIG. 2 is a network diagram illustrating five slice servers implementing part of a dispersed data storage network, where each slice server is located at a separate site, and has varying performance characteristics.

FIG. 2 is a network diagram depicting part of a DDSN. In particular, five slice servers located at different sites are shown. By example, the first slice server 202 could be located within Tokyo, Japan, and be implemented using mid-range hardware and with a mid-speed Internet connection. A second slice server 204 could be located in Sydney, Australia, and be implemented with high end hardware and a slow and/or overloaded connection to the Internet. A third slice server 206 could be located in Chicago, Ill., and be implemented with high end hardware and a fast connection to the Internet. A fourth slice server 208 could be located in Toronto, Ontario, and be implemented with mid-range hardware and a mid-speed connection to the Internet. Finally, a fifth slice server 210 could be located in Paris, France, and be implemented with high-end hardware and a fast connection to the Internet.

While hardware quality and connection speed are partially determinative of a slice server's performance, other factors are relevant as well. For example, the number of operations a particular slice server is presently handling can affect the ability of a slice server to quickly handle additional operations. This quantity is commonly characterized as "load %," i.e., the number of operations a slice server is presently handling divided by the maximum number of operations a slice server can concurrently service. Of course, a drive must have a sufficient amount of storage to store a particular data slice as well. Finally, the occurrence of an earthquake or other disaster, natural or otherwise, can adversely affect the performance of a slice server located nearby even if the slice server's other performance related characteristics appear acceptable. During and immediately after disasters, telephony networks tend to experience increased load, and more importantly, bursts of usage that could drown out access to a slice server.

FIG. 3 is a table summarizing some performance criteria collected from the group of five slice servers shown in FIG. 2. The first two columns, ping time, and historical responsiveness, are indicators of connection speed. Ping time refers to the time between which a "request" packet is issued to a slice server, and the time a "response" packet is received from the slice server. Generally, ping time will be measured periodically, such as every minute or every ten minutes. Historical responsiveness is an indication of how responsive a particular slice server has been historically; for example, a rolling average of ping time. Load % is, as discussed above, an indication of how many operations a particular server is handling as a percentage of its maximum capacity.

Each server also contains a "composite score," which is calculated using a formula such as the following:

$$\text{Score} = \frac{A}{T_P} + \frac{B}{T_H} + \frac{C}{L}$$

Where A, B, and C are constants, $T_P$ is a particular slice server's most recent ping time, $T_H$ is a particular slice server's historical response time, L is a particular slice servers load %, and S is a particular slice server's available storage %. For the figures contained in FIG. 3, A and B are both set to 1, while C is set to 2.

FIG. 3 illustrates one potential way that a preference rating could be developed for a network of slice servers. Other criteria could also be used; for example, certain data slices may require less processing to combine with other data slices dependent on the particular dispersal algorithm used, and therefore, those slices that are easier to combine with one another could be weighted higher than other data slices.

Assuming that a DDSN is implemented by the five servers of FIG. 2, and further assuming that while each data segment stored to the DDSN is segmented into five slices, but only three of those slices are required to reconstruct any data segment, the slice servers selected to service a read request could be based on the preference criteria of FIG. 3. For example, read requests could be issued to the three slice servers with the highest scores, i.e., slice server 5, slice server 4, and slice server 3. Alternatively, read requests could be issued to all five slice servers, and the first three data slices received could be used to reconstruct the requested data.

In addition to objective criteria, like that shown in FIG. 3 and discussed above, other criteria can be used to determine which servers will be used to fulfill given requests. These criteria take the form of policies. Policies can be based on territorial considerations, i.e., each slice server must be located in a separate state or country, or all slice servers must be located in a particular state or country. Policies can also be based on cost considerations, such as by adding an additional factor or factors to the composite score equation used above to rank slice servers by objective criteria. For example, if network usage for a particular slice server is more expensive generally, or if the cost of network usage varies based on time of day or other reasons, the composite score can be adjusted to make an affected slice server more or less desirable.

Policies could also be used to intelligently deal with network outages, and to optimize the tradeoff between how quickly a particular operation is completed and how many network resources a particular operation consumes. For example, if a certain number of slice servers are unavailable, those slice servers could be eliminated from consideration when attempting to assemble a list of servers containing relevant data slices. Further, if a certain number of slice servers should fail to provide a data slice during a read operation, those slice servers could be removed from consideration, and the remaining slice servers could be read. For example, a DDSN could operate where each segment is sliced into 128 data slices, 96 of which are required to reconstruct the data segment. In such a system, 104 slices could be initially read, theoretically providing 8 redundant slices if all reads were successful. Further, if only 91 of the slices are successfully read, a second read would be made to slice servers selected from the 24 that were not contacted during the first read. To improve the odds for success, 4 extra servers, e.g., 9 in total, could be read. Alternatively, a multiplier, such as 1.5, could be used to determine how many servers to use. In this case, 5 slices are required, so using a multiplier of 1.5 would cause 8 (7.5 rounded up) servers to be read. A person of ordinary skill in the art could, after examining the disclosure contained herein, devise numerous other useful policies.

FIGS. 4A-4C show the process by which a DDSN, constructed in accordance with the disclosed invention, could fulfill a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,613, titled "VIRTUALIZED DATA STORAGE VAULTS ON A DISPERSED DATA STORAGE NETWORK," filed on Oct. 9, 2007 and assigned to Cleversafe, Inc. In step 404, the variable m is initialized to the minimum number of slices required to construct the requested data segment. As described herein, for each successfully received and validated slice, m is decremented.

In step 406, a list of slice servers each holding a required data slice that has yet to be received is assembled, and in step 408, the list is ordered by any applicable criteria. The applicable criteria could be an objective ranking, as depicted in FIG. 3 and discussed above, some number of user-defined policies, or some combination of objective ranking and user-defined policies. In step 410, read requests are issued to the first k slice servers on the assembled list, where k is at least equal to m, the minimum number of data slices needed to reconstruct the requested data segment, but could be as large as n, the number of data slices that have data relevant to the requested data segment.

In step 412, r data slices are received, and in step 414 the number of received data slices r is subtracted from the variable m. In step 416, m is compared to zero, and if m is not equal to zero, execution returns to step 406 and proceeds as normal from there. However, if m is equal to zero, a collection of data transformations may optionally be applied to the received slices in step 418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice was corrupted. However, if the applied data transformations were successful for all received data slices, the received slices are assembled into the requested block of data in step 424. The same or different data transformations may optionally be applied to the assembled data block in step 426, which completes the read process.

Figure 5B:
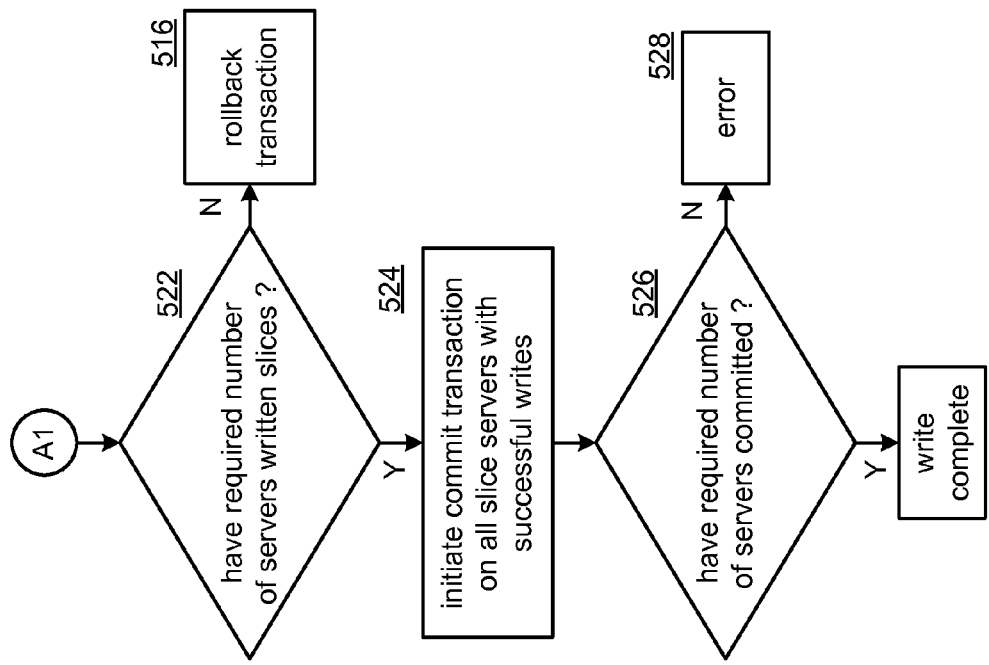
FIGS. 5A-5B collectively illustrates a write operation from a dispersed data storage grid constructed in accordance with an embodiment of the disclosed invention.
Figure 5A:
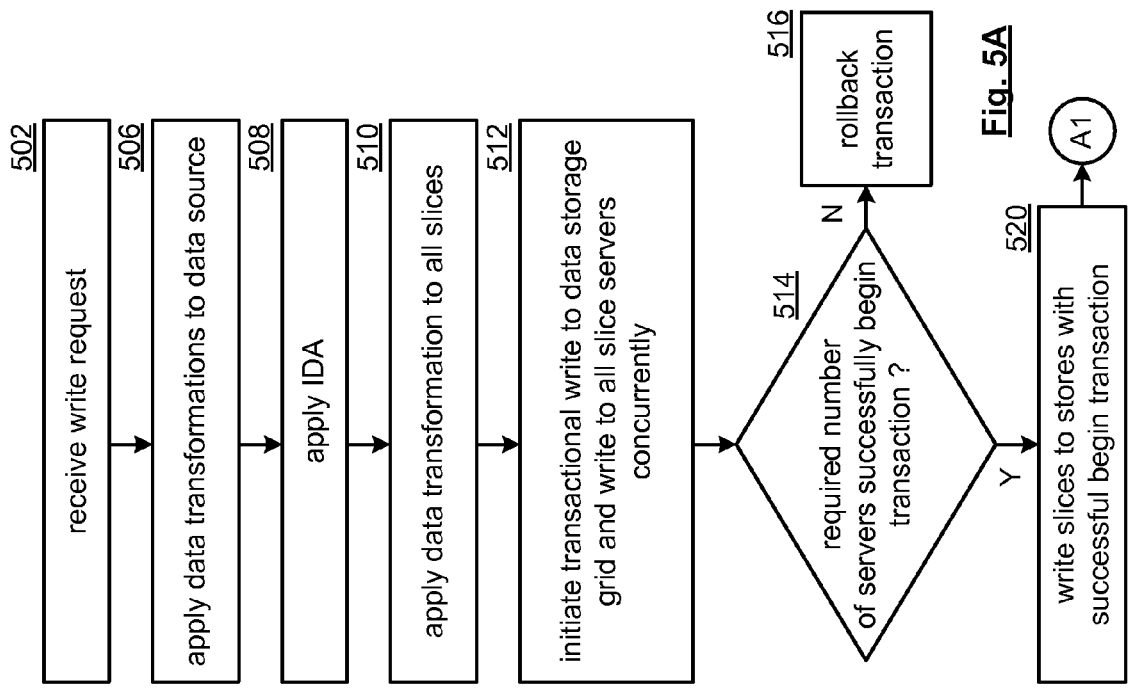

In FIGS. 5A-5B the process by which a DDSN, constructed in accordance with the disclosed invention, could write data to a network of slice servers is illustrated. In step 502 a data segment write request is received. Included in this write request is information sufficient to determine which slice servers the data segment should be written to, as well as information required by the information dispersal algorithm to divide the data segment, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,613, titled "VIRTUALIZED DATA STORAGE VAULTS ON A DISPERSED DATA STORAGE NETWORK," filed on Oct. 9, 2007 and assigned to Cleversafe, Inc.

A number of data transformations may optionally be applied to each block in step 506, and an information dispersal algorithm is applied in step 508. In particular, the Cauchy Reed-Solomon dispersal algorithm could be applied to the data segment, resulting in a predetermined number of data slices. In step 510, a number of data transformations are optionally applied to each data slice.

In the disclosed system, writes are transactional, meaning that a minimum number of data slices t must be successfully written before a write is deemed complete, and if at least t slices are not written, the write is deemed a failure, and all successfully written slices are "rolled back." Normally, the number of data slices that must be successfully written will be set to n, i.e., the number of slices that the data segment was originally divided into. However, this number can be configured by the user to a lesser number, down to the minimum number of slices required to reconstruct the data. This would allow the user to continue using the DDSN during a minor network outage where one or more slice servers were unavailable. If all slices were not successfully written, the data segment would be flagged, and, once the outage had cleared, the data segment would be rebuilt from the successfully stored slices, re-sliced, and the remaining slices stored. In step 512, a write transaction is initiated to the data storage grid. As discussed herein, all slice servers are simultaneously contacted, and in step 514, a confirmation that at least t receiving slice servers are prepared to begin the write transaction, i.e., to store each slice, must be received, or the transaction is rolled back in step 516.

In step 520 data slices are transmitted to the slice servers that indicated their ability to receive and store slices. The number of slice servers that successfully received and stored their assigned data slices is checked in step 522, and if less than t slices are successfully stored, the transaction is rolled back in step 516. In step 524, a commit transaction is initiated on all servers with successful writes. If the commit transaction fails, an error is logged in step 528. Otherwise, the write transaction was successful. Within a DDSN, one situation bears special consideration. For a "high-redundancy" DDSN where the minimum number of data slices required to reconstruct a data segment is at most half of the number of total data slices created for each data segment, a situation may develop where multiple versions of a data segment are stored on a DDSN simultaneously. In other words, versioning issues may be a concern where the following equality is satisfied:

$$\frac{m}{n} \leq 0.5$$

For example, assume that a particular DDSN is implemented where n is set to 16 and m is set to 8. Further assume that a data segment is successfully written to all 16 slice servers. The same data segment is then written a second time with modified data, but during the second write only 8 data slices are successfully written. As the minimum number of data slices required to reconstruct the data segment have been successfully written, the write could be considered a success. However, during a read operation, the old version of the data segment could conceivably be retrieved because 8 data slices still exist with the old version.

This problem can be dealt with by adding an additional field to each stored data slice indicating not only what data segment the data slice is associated with, but also, what version of the data segment the data slice is associated with. When a read is made to a high-redundancy DDSN, at least n−m+1 data slices are read and the version field is compared across all slices. If the version fields for the data slices vary, only the data slices with the most current version are used to reconstruct the requested data segment, and if necessary, additional data slices are read as well until a sufficient number of the most current data slices are available.

Within this application, operations have been presented singularly for the sake of clarity. However, in most actual implementations, read and write operations will be conglomerated so that a plurality of read operations or a plurality of write operations will be carried out simultaneously by the DDSN. For example, a particular client computer may, at any given time, be reading or writing ten or more files. Those files may be accessing entirely different data segments, or there may be some amount of overlap in the accessed data segments. Generally, when multiple data segments are accessed simultaneously, the same principles that have been described herein for unitary accesses will apply. However, under certain circumstances, various optimizations may follow. For example, if it is determined that insufficient slice servers are available to perform a write operation, then the write process can be optimized by failing all write operations directed towards the same network of slice servers, instead of individually attempting to write each data segment.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for reading data from a dispersed data storage network that includes a plurality of slice servers, the method operating on at least one computer and comprising the steps of:

accessing a list of slice servers of the plurality of slice servers, wherein each slice server on the list stores at least one data slice associated with a data segment of the data;

transmitting read requests to a threshold number of the slice servers on the list;

receiving data slices from slice servers of the threshold number of slice servers;

determining whether a threshold number of data slices has been received from the threshold number of slice servers;

when the threshold number of data slices has not been received:

transmitting a read request to another slice server on the list;
receiving a data slice from the other slice server; and
repeating the transmitting a read request and receiving a data slice until the threshold number of data slices is received; and when the threshold number of data slices has been received, assembling the data segment from at least the threshold number of data slices by performing an information dispersal algorithm on the at least the threshold number of data slices to produce the data segment.

2. The method of claim 1, wherein the determining whether the threshold number of data slices further comprises:
- for each receipt of a data slice, updating a received data slice count to produce an updated data slide count;
- comparing the updated data slice count with the threshold number of data slices; and
- when the comparing the updated data slice count with the threshold number of data slices is favorable, indicating that the threshold number of data slices has been received.

3. The method of claim 1, wherein the assembling the data segment from at least the threshold number of data slices further comprises:
- data transforming each data slice of the at least the threshold number of data slices to produce data transformed data slices, wherein the data transforming includes one or more of decryption, decompression, and integrity checking.

4. The method of claim 3 further comprises:
- determining whether the data transforming of each the at least the threshold number of data slices is successful;
- when the data transforming of a data slice of the at least the threshold number of data slices was unsuccessful, receiving at least one more data slice from at least one more slice server on the list;
- data transforming the at least one more data slice to produce at least one more data transformed data slice;
- determining whether the data transforming of the at least one more data slice is successful;
- when the data transforming of the at least one more data slice is successful, determining whether the at least the threshold number of data slices have been successfully data transformed; and
- when the at least the threshold number of data slices have been successfully data transformed, assembling the data segment from the data transformed data slices.

5. The method of claim 1, wherein the assembling the data segment from at least the threshold number of data slices further comprises:
- for each data slice of the at least the threshold number of data slices, reading a version field to produce version data;
- comparing the version data of the at least the threshold number of data slices;
- when the version data of the at least the threshold number of data slices substantially match, indicating a current version of the at least the threshold number of data slices for assembling the data segment; and
- when the version data for the at least the threshold number of data slices does not substantially match, receiving at least one more data slice from at least one more slice server on the list, wherein the at least one more data slice has the version data corresponding to the current version.

6. A method for reading data from a dispersed data storage network that includes a plurality of slice servers, the method operating on at least one computer and comprising the steps of:
- accessing a list of slice servers of the plurality of slice servers, wherein each slice server on the list stores at least one data slice associated with a data segment of the data;
- determining whether one or more of the slice servers on the list are unavailable due to a network outage;
- when one or more of the slice servers on the list unavailable due to the network outage, determining whether at least a threshold number of slice servers on the list is not affected by the network outage;
- when the at least the threshold number of slice servers on the list is not affected by the network outage, transmitting read requests to the at least the threshold number of the slice servers on the list;
- receiving data slices from slice servers of the at least the threshold number of slice servers;
- determining whether a threshold number of data slices has been received;
- when the threshold number of data slices has not been received:
- transmitting a read request to another slice server on the list;
- receiving a data slice from the other slice server; and
- repeating the transmitting a read request and receiving a data slice until the threshold number of data slices is received; and
- when the threshold number of data slices has been received, assembling the data segment from at least the threshold number of data slices by performing an information dispersal algorithm on the at least the threshold number of data slices to produce the data segment.

7. The method of claim 6 further comprises:
- when a number of slice servers on the list is unavailable due to the network outage is greater than a total number of slice servers on the list minus the threshold number of slice servers, generating a read error message.

8. The method of claim 6, wherein the determining whether the threshold number of data slices further comprises:
- for each receipt of a data slice, updating a received data slice count to produce an updated data slide count;
- comparing the updated data slice count with the threshold number of data slices; and
- when the comparing the updated data slice count with the threshold number of data slices is favorable, indicating that the threshold number of data slices has been received.

9. The method of claim 6, wherein the assembling the data segment from at least the threshold number of data slices further comprises:
- data transforming each data slice of the at least the threshold number of data slices to produce data transformed data slices, wherein the data transforming includes one or more of decryption, decompression, and integrity checking.

10. The method of claim 9 further comprises:
- determining whether the data transforming of each the at least the threshold number of data slices is successful;
- when the data transforming of a data slice of the at least the threshold number of data slices was unsuccessful, receiving at least one more data slice from at least one more slice server on the list;
- data transforming the at least one more data slice to produce at least one more data transformed data slice;
- determining whether the data transforming of the at least one more data slice is successful;
- when the data transforming of the at least one more data slice is successful, determining whether the at least the threshold number of data slices have been successfully data transformed; and
- when the at least the threshold number of data slices have been successfully data transformed, assembling the data segment from the data transformed data slices.

11. The method of claim 6, wherein the assembling the data segment from at least the threshold number of data slices further comprises:

for each data slice of the at least the threshold number of data slices, reading a version field to produce version data;

comparing the version data of the at least the threshold number of data slices;

when the version data of the at least the threshold number of data slices substantially match, indicating a current version of the at least the threshold number of data slices for assembling the data segment; and when the version data for the at least the threshold number of data slices does not substantially match, receiving at least one more data slice from at least one more slice server on the list, wherein the at least one more data slice has the version data corresponding to the current version.

12. A computer for use with a dispersed data storage network, the computer comprising:

a network port coupled to a data network, wherein the data network is coupled to a plurality of slice servers for storing and retrieving a plurality of data slices; and a central processing unit operable to:

access a list of slice servers of the plurality of slice servers, wherein each slice server on the list stores at least one data slice associated with a data segment of the data;

transmit read requests to a threshold number of the slice servers on the list;

receive data slices from slice servers of the threshold number of slice servers;

determine whether a threshold number of data slices has been received from the threshold number of slice servers;

when the threshold number of data slices has not been received:

transmit a read request to another slice server on the list;

receive a data slice from the other slice server; and repeat the transmitting a read request and receiving a data slice until the threshold number of data slices is received; and when the threshold number of data slices has been received, assemble the data segment from at least the threshold number of data slices by performing an information dispersal algorithm on the at least the threshold number of data slices to produce the data segment.

13. The computer of claim 12, wherein the central processing unit further functions to determine whether the threshold number of data slices by:

for each receipt of a data slice, updating a received data slice count to produce an updated data slide count;

comparing the updated data slice count with the threshold number of data slices; and when the comparing the updated data slice count with the threshold number of data slices is favorable, indicating that the threshold number of data slices has been received.

14. The computer of claim 12, wherein the central processing unit further functions to assemble the data segment from at least the threshold number of data slices by:

data transforming each data slice of the at least the threshold number of data slices to produce data transformed data slices, wherein the data transforming includes one or more of decryption, decompression, and integrity checking.

15. The computer of claim 14, wherein the central processing unit further functions to:

determining whether the data transforming of each the at least the threshold number of data slices is successful;

when the data transforming of a data slice of the at least the threshold number of data slices was unsuccessful, receiving at least one more data slice from at least one more slice server on the list;

data transforming the at least one more data slice to produce at least one more data transformed data slice;

determining whether the data transforming of the at least one more data slice is successful;

when the data transforming of the at least one more data slice is successful, determining whether the at least the threshold number of data slices have been successfully data transformed; and when the at least the threshold number of data slices have been successfully data transformed, assembling the data segment from the data transformed data slices.

16. The computer of claim 12, wherein the central processing unit further functions to assemble the data segment from at least the threshold number of data slices by:

for each data slice of the at least the threshold number of data slices, reading a version field to produce version data;

comparing the version data of the at least the threshold number of data slices;

when the version data of the at least the threshold number of data slices substantially match, indicating a current version of the at least the threshold number of data slices for assembling the data segment; and when the version data for the at least the threshold number of data slices does not substantially match, receiving at least one more data slice from at least one more slice server on the list, wherein the at least one more data slice has the version data corresponding to the current version.

17. A computer for use with a dispersed data storage network, the computer comprising:

a network port coupled to a data network, wherein the data network is coupled to a plurality of slice servers for storing and retrieving a plurality of data slices; and a central processing unit operable to:

access a list of slice servers of the plurality of slice servers, wherein each slice server on the list stores at least one data slice associated with a data segment of the data;

determine whether one or more of the slice servers on the list are unavailable due to a network outage;

when one or more of the slice servers on the list are unavailable due to the network outage, determine whether at least a threshold number of slice servers on the list is not affected by the network outage;

when the at least the threshold number of slice servers on the list is not affected by the network outage, transmit read requests to the at least the threshold number of the slice servers;

receive data slices from slice servers of the at least the threshold number of slice servers;

determine whether a threshold number of data slices has been received; and when the threshold number of data slices has not been received:

transmitting a read request to another slice server on the list;

receiving a data slice from the other slice server; and repeating the transmitting a read request and receiving a data slice until the threshold number of data slices is received; and when the threshold number of data slices has been received, assemble the data segment from the at least the threshold number of data slices by performing an information dispersal algorithm on the at least the threshold number of data slices to produce the data segment.

18. The computer of claim 17, wherein the central processing unit further functions to:

when a number of slice servers on the list is unavailable due to the network outage is greater than a total number of slice servers on the list minus the threshold number of slice servers, generate a read error message.

19. The computer of claim 17, wherein the central processing unit further functions to determine whether the threshold number of data slices by:

for each receipt of a data slice, updating a received data slice count to produce an updated data slide count;

comparing the updated data slice count with the threshold number of data slices; and when the comparing the updated data slice count with the threshold number of data slices is favorable, indicating that the threshold number of data slices has been received.

20. The computer of claim 17, wherein the central processing unit further functions to assemble the data segment from at least the threshold number of data slices by:

data transforming each data slice of the at least the threshold number of data slices to produce data transformed data slices, wherein the data transforming includes one or more of decryption, decompression, and integrity checking.

21. The computer of claim 17, wherein the central processing unit further functions to:

determining whether the data transforming of each the at least the threshold number of data slices is successful;

when the data transforming of a data slice of the at least the threshold number of data slices was unsuccessful, receiving at least one more data slice from at least one more slice server on the list;

data transforming the at least one more data slice to produce at least one more data transformed data slice;

determining whether the data transforming of the at least one more data slice is successful;

when the data transforming of the at least one more data slice is successful, determining whether the at least the threshold number of data slices have been successfully data transformed; and when the at least the threshold number of data slices have been successfully data transformed, assembling the data segment from the data transformed data slices.

22. The computer of claim 17, wherein the central processing unit further functions to assemble the data segment from at least the threshold number of data slices by:

for each data slice of the at least the threshold number of data slices, reading a version field to produce version data;

comparing the version data of the at least the threshold number of data slices;

when the version data of the at least the threshold number of data slices substantially match, indicating a current version of the at least the threshold number of data slices for assembling the data segment; and when the version data for the at least the threshold number of data slices does not substantially match, receiving at least one more data slice from at least one more slice server on the list, wherein the at least one more data slice has the version data corresponding to the current version.

* * * * *